(12) United States Patent
Hasegawa et al.

(10) Patent No.: US 11,136,228 B2
(45) Date of Patent: Oct. 5, 2021

(54) FORKLIFT AND FORK MEMBER OF THE SAME

(71) Applicant: MITSUBISHI HEAVY INDUSTRIES, LTD., Tokyo (JP)

(72) Inventors: Noriyuki Hasegawa, Tokyo (JP); Kensuke Futahashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/696,042

(22) Filed: Nov. 26, 2019

(65) Prior Publication Data

US 2020/0307977 A1 Oct. 1, 2020

(30) Foreign Application Priority Data

Mar. 25, 2019 (JP) .............................. JP2019-057306

(51) Int. Cl.
*B66F 9/16* (2006.01)
*B66F 9/08* (2006.01)
*F16F 15/067* (2006.01)
*F16F 15/02* (2006.01)

(52) U.S. Cl.
CPC ............... *B66F 9/16* (2013.01); *B66F 9/082* (2013.01); *F16F 15/022* (2013.01); *F16F 15/067* (2013.01)

(58) Field of Classification Search
CPC ...... B66F 9/06; B66F 9/12; B66F 9/16; B66F 9/082; B65G 1/0407; F16F 15/022
USPC ....... 414/273, 283, 284, 619, 631, 632, 633, 414/660
See application file for complete search history.

(56) References Cited

U.S. PATENT DOCUMENTS

| | | | | |
|---|---|---|---|---|
| 2,899,093 | A | * 8/1959 | Morrell | ..................... B66F 9/20 |
| | | | | 414/639 |
| 3,741,346 | A | * 6/1973 | Herdemann | .............. B66F 9/12 |
| | | | | 187/237 |
| 3,845,577 | A | 11/1974 | Naymik | |
| 2006/0096764 | A1 | 5/2006 | Brouwer et al. | |
| 2009/0271058 | A1 | 10/2009 | Chilson | |
| 2016/0122077 | A1 | 5/2016 | Moran et al. | |

FOREIGN PATENT DOCUMENTS

| | | |
|---|---|---|
| CN | 201390637 | 1/2010 |
| CN | 102066233 | 5/2011 |
| CN | 202429965 | 9/2012 |
| CN | 106044643 | 10/2016 |
| CN | 109422212 | 3/2019 |
| GB | 1 599 562 | 10/1981 |

(Continued)

*Primary Examiner* — Saul Rodriguez
*Assistant Examiner* — Willie Berry, Jr.
(74) *Attorney, Agent, or Firm* — Wenderoth, Lind & Ponack, L.L.P.

(57) ABSTRACT

A forklift includes a lift bracket which is supported on a mast so as to be capable of being moved upward or downward along the mast, and a fork member having a fork claw portion on which a pallet is allowed to be placed, and supported on the lift bracket. The lift bracket has a support portion which is on a tip portion of the lift bracket and supports the fork member. When a weight is applied onto the fork claw portion, the fork member is configured to rotate around the support portion which is configured to serve as a pivot, in response to an application force exerted onto the fork claw portion.

13 Claims, 7 Drawing Sheets

(56) References Cited

FOREIGN PATENT DOCUMENTS

| JP | 2003-182993 | 7/2003 |
|----|-------------|--------|
| JP | 2003-267686 | 9/2003 |
| JP | 2017-19595  | 1/2017 |

* cited by examiner

FORKLIFT AND FORK MEMBER OF THE SAME

CROSS-REFERENCE TO RELATED APPLICATION

Priority is claimed from Japanese Patent Application No. 2019-057306, filed on Mar. 25, 2019, the content of which is incorporated herein by reference.

BACKGROUND OF THE INVENTION

Field of the Invention

The present disclosure relates to a forklift and a fork member of the same.

Description of Related Art

When pallets loaded with cargoes are stacked on top of each other, since a cargo on a lower pallet is compressed and deformed due to the weight of a cargo on an upper pallet, accordingly a fork pocket is inclined, when the cargoes are handled by a forklift, a fork member may come into contact with the inclined fork pocket, and the pallets and the cargoes may be flipped over, which is a problem.

For example. Japanese Unexamined Patent Application, First Publication No. 2017-19595 discloses a cargo handling method in which the inclination of the fork pocket with respect to an entry direction of a fork is detected based on a distance to the fork pocket, into which the fork member is inserted, measured by a laser sensor, and the height of the laser sensor at that time, and based on the detected inclination, it is determined whether or not to change the inclination of the fork member.

SUMMARY OF THE INVENTION

Even though the inclination of the fork pocket is very small, the fork member may come into contact with the inclined fork pocket and the pallet and the cargo may be flipped over, which is a problem. However, as disclosed in Japanese Unexamined Patent Application, First Publication No. 2017-19595, when the inclination of the fork pocket is detected by the laser sensor, if the inclination is very small, there is a possibility that the inclination cannot be well detected.

Accordingly, an object of several embodiments of the present invention is to provide a forklift that is capable of inserting a fork member into a fork, pocket while preventing a pallet and a cargo loaded on the pallet from being flipped over by displacing the fork member in response to the inclination of the fork pocket of the pallet.

According to at least one embodiment of the present invention, there is provided a forklift including a lift bracket which is supported on a mast and which is capable of being moved upward or downward along the mast, and a fork member having a fork claw portion on which a pallet is allowed to be placed, and supported on the lift bracket, wherein the lift bracket has a support portion which is formed on a tip portion of the lift bracket and which supports the fork member. When a weight is applied onto the fork claw portion, the fork member displaces around the support portion which is configured to serve as a pivot, in response to an application force exerted onto the fork claw portion.

According to several embodiments of the present invention, it is possible to insert the fork member into a fork pocket while preventing the pallet and a cargo loaded on the pallet from being flipped over by displacing the fork member in response to the inclination of the fork pocket of the pallet.

DETAILED DESCRIPTION OF THE INVENTION

Figure 1:
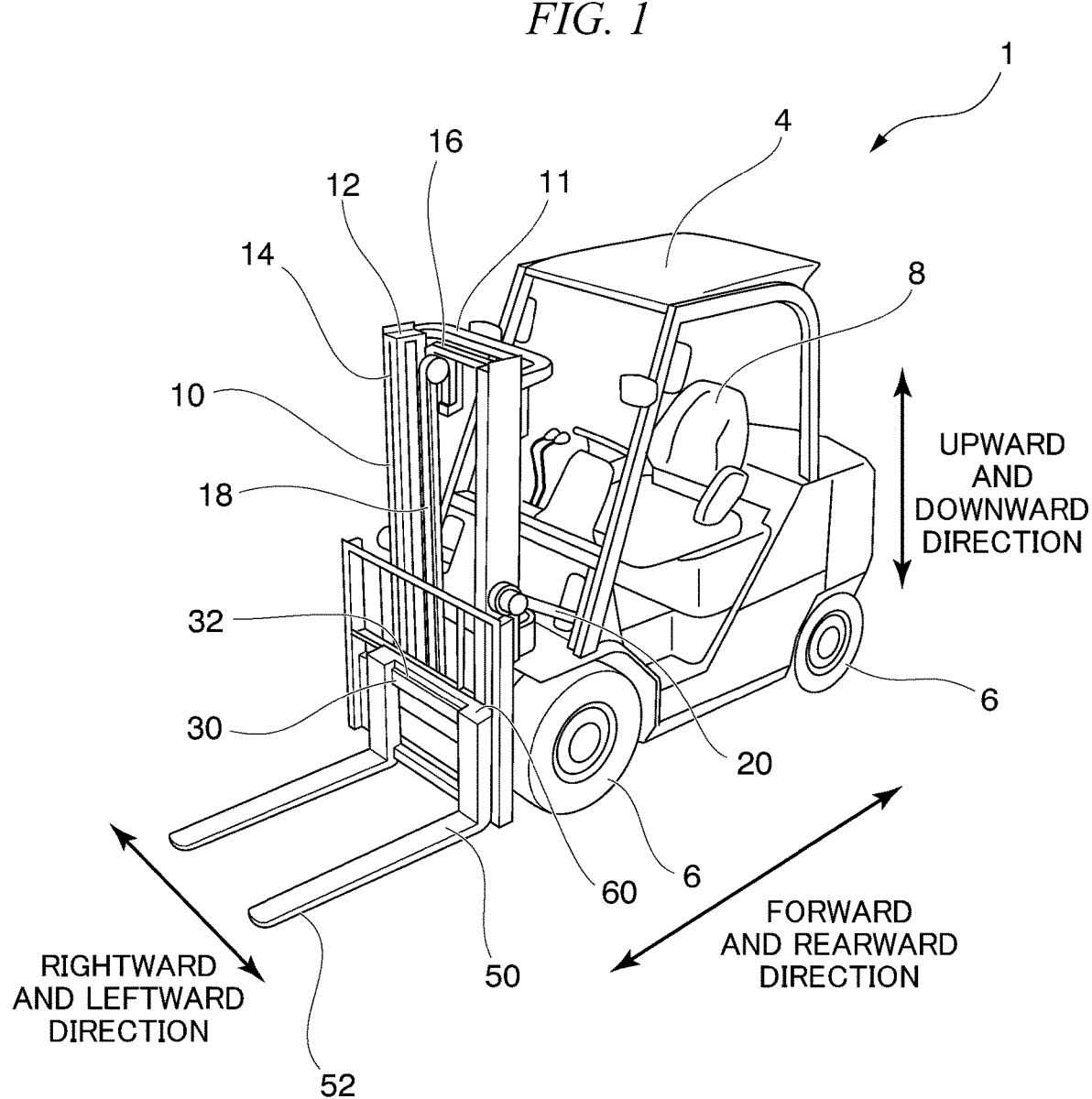
FIG. 1 is a schematic configuration view of a forklift according to one embodiment of the present invention.

Several embodiments of the present invention will be described with reference to the accompanying drawings. However, the dimensions, materials, shapes, relative arrangements, and the like of configuration components described in the embodiments or shown in the drawings are not intended to limit the scope of the present invention, but are merely descriptive examples. An expression which represents a relative or absolute arrangement such as "in a direction", "along a direction", "parallel", "orthogonal", "center", "concentric", or "coaxial" not only represents strictly such arrangement, but also represent a state of relative displacement with a tolerance, or an angle or a distance which allows the same function.

An expression such as "the same", "equal", or "homogeneity", which represents that things are equal to each other, not only represents a state of being strictly equal, but also represents a state where there exists a tolerance or a difference which allows the same function.

An expression which represents a shape such as a square shape or a cylindrical shape not only represents a shape such as a square shape or a cylindrical shape in a geometrically strict sense, but also represents a shape including an uneven portion, a chamfered portion, or the like as long as the same effect can be obtained.

On the other hand, an expression such as "including", "being equipped with", "being furnished with", or "containing" one configuration element is not an exclusive expression which excludes the existence of other configuration elements.

FIG. 1 is a schematic configuration view of a forklift 1 according to one embodiment of the present invention.

The forklift 1 according to one embodiment of the present invention will be described with reference to FIG. 1.

As shown in FIG. 1, the forklift 1 according to one embodiment of the present invention includes a vehicle body 4, and a cargo handling device 10 provided in the vehicle body 4.

The vehicle body 4 is provided with a wheel 6 that is driven by an engine (not shown), or a battery (not shown) and a motor (not shown).

Incidentally, the forklift 1 may be a manned operation type which is operated by a person, may be an unmanned operation type which is operated by a laser-guided method, or may be a remote operation type which is remotely operated. When the forklift 1 which is an unmanned operation type or a remote operation type is used, the vehicle body 4 may not include a driver seat 8 in which an operator sits. In addition, the forklift 1 may be a counter type or a reach type.

The cargo handling device 10 is provided in a forward advancing direction (refer to as a forward direction) of the vehicle body 4. The cargo handling device 10 includes a mast member 11; a lift bracket 30; a fork member 50; and a tilt cylinder 20.

The mast member 11 includes an outer mast 12 supported on the front of the vehicle body 4, and an inner mast 16 that is supported on the outer mast 12 and is able to move in a vertical direction. Incidentally, the outer mast 12 is able to move in a forward and rearward direction of the vehicle body 4.

The outer mast 12 includes an outer guide 14 erected on a carriage (not shown) that is provided in the front of the vehicle body 4. In the embodiment shown in FIG. 1, the outer guides 14, specifically, one each on the right and the left are erected on the carriage so as to extend in an upward direction.

The inner mast 16 is supported on the outer mast 12, and is guided by the outer guide 14 so as to be capable of being moved upward and downward.

The lift bracket 30 is connected to the outer mast 12 by a chain 18, and is supported on the inner mast 16 so as to be capable of being moved upward and downward.

The lift bracket 30 includes a support portion 32 that is provided in an upper tip portion of the lift bracket 30 and supports the fork member 50. The support portion 32 is a planar member, and is able to change a position in a rightward and leftward direction in which the fork member 50 is supported. The support portion 32 may integrally shaped with the lift bracket 30, or may be a member fixed to the lift bracket 30.

The fork member 50 includes a fork support portion 60 supported on the lift bracket 30, and a fork claw portion 52 that can be inserted into a fork pocket of a pallet. The fork claw portion 52 extends in a substantially horizontal direction, and is inserted into the fork pocket of the pallet to support the pallet and a cargo loaded on the pallet. The thickness of the fork member 50 is substantially uniform, but a tip portion of the fork claw portion 52 is formed thin so as for the fork member 50 to be easily insertable into the fork pocket. In the embodiment shown in FIG. 1, two fork claw portions 52 are provided in front of the vehicle body 4, and has an L shape that makes an angle of substantially 90 degrees with a surface where the lift bracket 30 and the fork member 50 face each other in the horizontal direction.

The tilt cylinder 20 is a hydraulic device provided in front of the vehicle body 4, and includes a rod portion that connects the vehicle body 4 to the mast member 11 or the lift bracket 30, and a cylinder portion fixed onto the mast member 11 or the lift bracket 30. The rod portion is pushed in the forward direction, accordingly the fork member 50 is tilted around an axis. Incidentally, tilt-up control refers to control for tilting the fork claw portion 52 in the upward direction by extending and contracting the tilt cylinder 20.

FIGS. 2 to 12 are schematic configuration views of the fork member 50 and the lift bracket 30 according to one embodiment of the present invention.

Up to now, the entire configuration of the forklift 1 has been described.

The configuration of the fork member 50 and the lift bracket 30 in the forklift 1 according to one embodiment of the present invention will be described with reference to FIGS. 2 to 12.

In several embodiments of the present invention, as shown in FIGS. 2 to 12, when a weight is applied to the fork claw portion 52, the fork member 50 displaces around the support portion 32, which serves as a pivot, in response to an application force excited onto the fork claw portion 52.

Figure 2:
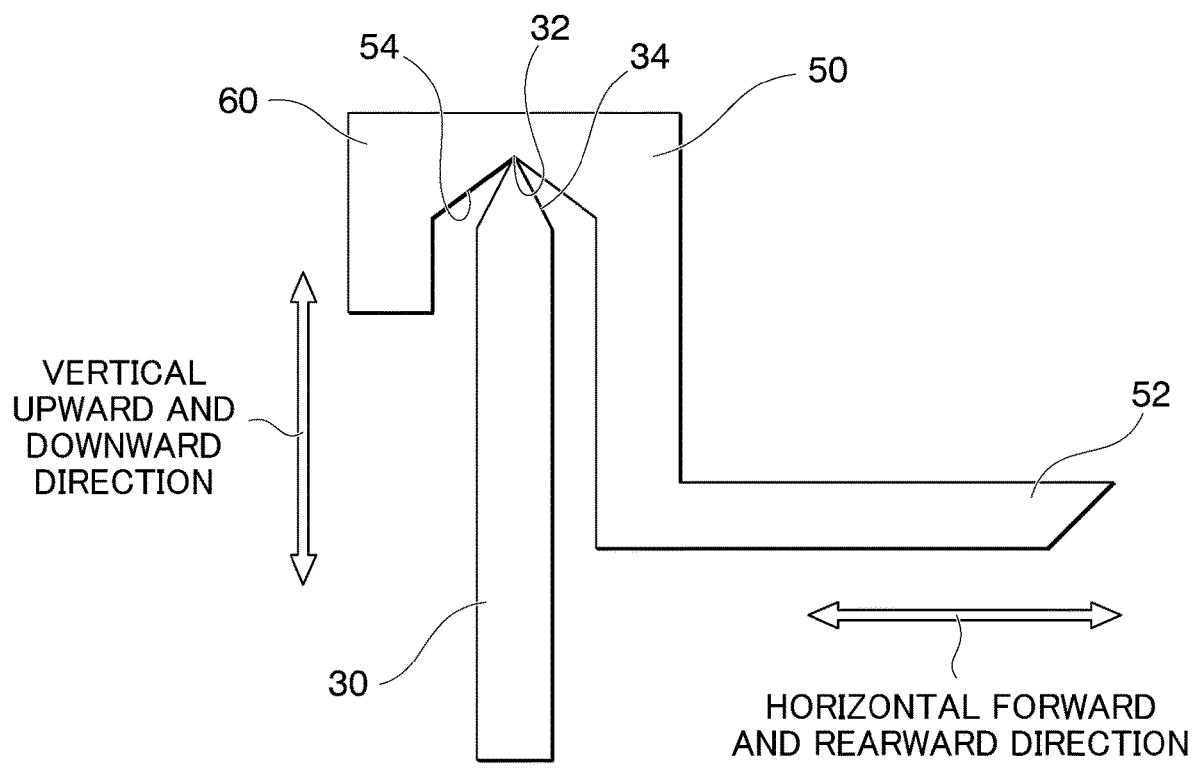
FIG. 2 is a schematic configuration view of a fork member and a lift bracket according to one embodiment of the present invention.

In the embodiment shown in FIG. 2, when no load is applied to the fork member 50, the fork claw portion 52 extends in a substantially horizontal direction.

Figure 4:
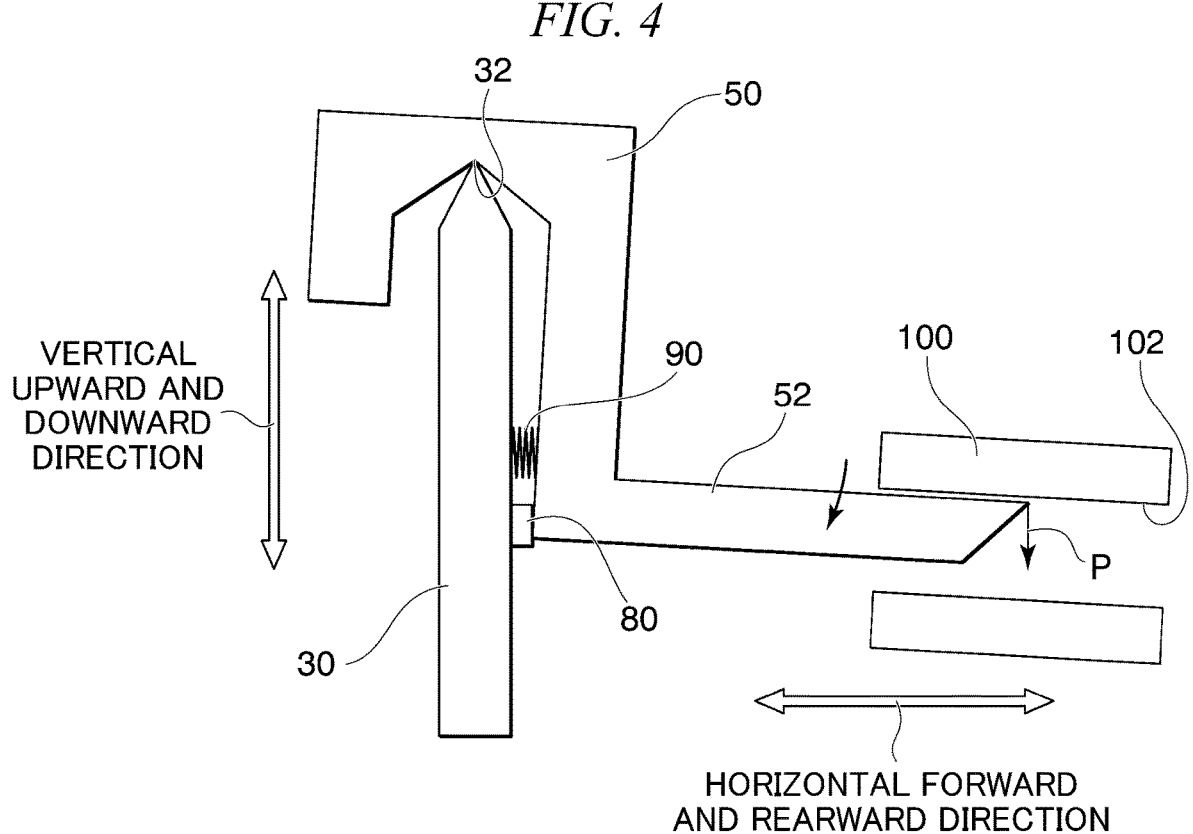
FIG. 4 is a schematic configuration view of a fork member and a lift bracket according to one embodiment of the present invention.

On the other hand, in the embodiment shown in FIG. 4, in the transportation of a pallet 100 loaded with a cargo (not shown), even though a fork pocket 102 of the pallet 100 is inclined, the position of the fork claw portion 52 is displaced to align with the inclination, and the fork claw portion 52 is inserted following the fork pocket 102. Namely, when an application force P is exerted onto the fork member 50 in the vertical direction due to the inclination of the fork pocket 102, the fork member 50 is displaced in response to the application force P. Therefore, even though the fork pocket 102 of the pallet 100 is inclined due to the weight of the loaded cargo, since the fork member 50 (the fork claw portion 52) receives the application force P from the fork pocket 102 and is displaced in response to the inclination, it is possible to insert the fork member 50 (the fork claw portion 52) into the fork pocket 102 while preventing the pallet 100 and the cargo from being flipped over.

Figure 3:
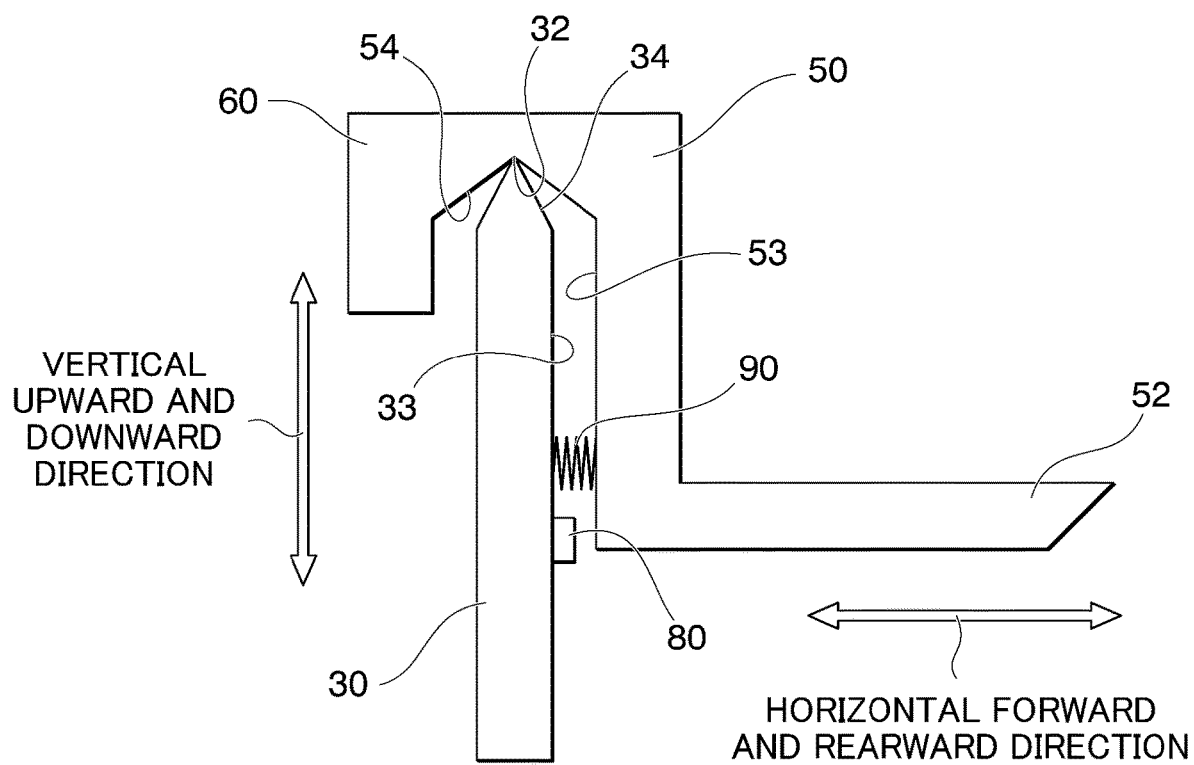
FIG. 3 is a schematic configuration view of a fork member and a lift bracket according to one embodiment of the present invention.

The support portion 32 having the above-mentioned configuration may support the fork member 50, as shown in FIGS. 2 to 4, at one point when seen from a side of the vehicle body 4.

The fork support portion 60 of the fork member 50 extends in an L shape that makes an angle of substantially 90 degrees in a direction which is opposite to a surface facing the lift bracket 30 in the horizontal direction and the fork claw portion 52. Since the fork support portion 60 is supported at one point by the support portion 32 when seen from the side of the vehicle body 4, a space is made between surfaces of the fork member 50, which face the lift bracket 30 in the horizontal direction, and the lift bracket 30, and the fork member 50 is balanced between front and rear with the lift bracket 30 interposed between portions of the fork member 50. Therefore, when the application force P is exerted onto the fork member 50 in the vertical direction, the fork member 50 rotates around the support portion 32 serving as a pivot. As a result, the fork claw portion 52 is displaced (tilted) in the vertical direction. As a result, when the fork claw portion 52 is inserted into the pallet 100, even though the fork pocket 102 is tilted upward or downward, since the fork member 50 is displaced in response to the inclination of the fork pocket 102, it is possible to insert the fork member 50 while preventing the pallet 100 and the cargo from being flipped over.

incidentally, with the support portion 32 interposed between the portions of the fork member 50, the fork member 50 may be balanced between front and rear by the weight of the fork member 50, or may be balanced between front and rear by a reaction force of an elastic member 90 (to be described later) and the weight of the fork member 50. The elastic member 90 may be a compression spring or rubber. In addition, even though the elastic member 90 is a leaf spring or a torsion coil spring, it is possible to obtain the same effect by changing an attachment position or method.

In the embodiment shown in FIG. 3, the elastic member 90 is attached to a surface (namely, the surface where the lift bracket 30 and the fork member 50 face each other in the horizontal direction) where a front surface 33 of the lift bracket 30 and a rear surface 53 of the fork member 50 face each other. When a weight is applied to the fork claw portion 52, the elastic member 90 displaces the fork member 50 around the support portion 32, which serves as a pivot, in the direction of the application force P due to the stress of the elastic member 90. For this reason, even though the fork pocket 102 of the pallet 100 is inclined due to the weight of the loaded cargo, the fork member 50 is displaced in response to the inclination of the fork pocket 102. Therefore, it is possible to insert the fork member 50 into the fork pocket 102 while preventing the pallet 100 and the cargo from being flipped over. Incidentally, when the elastic member 90 is a compression spring, the elastic member 90 is attached to a position corresponding to the position of each of the fork members 50. In addition, when the elastic member 90 is rubber, the elastic member 90 may be attached in the same manner as the compression spring, or may be attached in common to a plurality of the fork members 50 via a member having a planar shape in the rightward and leftward direction.

As shown in FIG. 3, the lift bracket 30 according to one embodiment of the present invention may include a spacer member 80 on the surface where the front surface 33 of the lift bracket 30 and the rear surface 53 of the fork member 50 face each other, namely, on the surface where the lift bracket 30 and the fork member 50 face each other in the horizontal direction.

The deflection angle of the fork member 50 can be adjusted by the spacer member 80. As a result, it is possible to prevent the elastic member 90 from being worn out or deformed. The spacer member 80 has the strength required to support the fork member 50, for example, a strength greater than or equal to the strength of the lift bracket 30, and is positioned above or below the elastic member 90. In addition, the spacer member 80 may be attached to a position corresponding to the position of each of the fork members 50, or may be attached in common to the plurality of fork members 50 via a member having a planar shape in the rightward and leftward direction. When the elastic member 90 is a compression spring, the spacer member 80 may be attached inside the elastic member 90. In addition, the length of the spacer member 80 in the horizontal direction is adjusted by the position of the spacer member 80 such that the length of the compression spring is not less than a close contact length.

As shown in FIGS. 2 to 4, the support portion 32 may include a V-shaped protrusion portion 34 which is a protrusion having a V shape, and the fork member 50 may include a V-shaped recess portion 54 that is a recess portion having a V shape which is supported by the support portion 32. In this case, the angle of the V-shaped protrusion portion 34 is less than the angle of a groove of the V-shaped recess portion 54 is employed. A space required for the displacement of the fork claw portion 52 is held between the V-shaped protrusion portion 34 and the V-shaped recess portion 54.

According to the above-mentioned configuration, since the V-shaped recess portion 54 of the fork member 50 is supported at one point by the V-shaped protrusion portion 34 of the support portion 32, the V-shaped recess portion 54 can be displaced (tilted) around the support portion 32, which serves as a pivot, in the vertical direction in response to the application force P exerted onto the fork member 50. As a result, when the fork claw portion 52 is to be inserted into the pallet 100, even though the fork pocket 102 is tilted upward or downward, since the fork member 50 is displaced to align with the inclination, it is possible to insert the fork member 50 while preventing the pallet 100 and the cargo from being flipped over.

Figure 5:
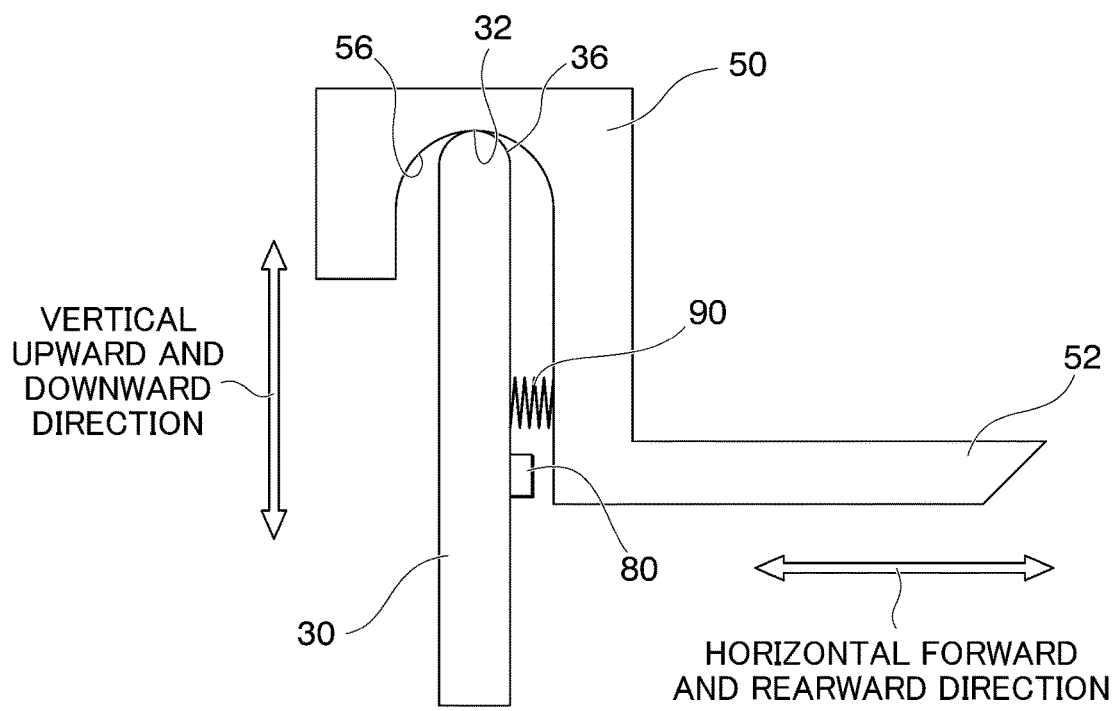
FIG. 5 is a schematic configuration view of a fork member and a lift bracket according to one embodiment of the present invention.

On the other hand, as shown in FIG. 5, the support portion 32 may include an arc-shaped protrusion portion 36 which is a protrusion having an arc shape, and the fork member 50 may include an arc-shaped recess portion 56 which is a recess portion having an arc shape and having a larger curvature than that of the arc-shaped protrusion portion 36 of the support portion 32.

According to the above-mentioned configuration, since the arc-shaped recess portion 56 of the fork member 50 is supported at one point by the arc-shaped protrusion portion 36 of the support portion 32, the arc-shaped recess portion 56 can be displaced around the support portion 32, which serves as a pivot, in the direction of the application force P that is exerted onto the fork member 50 in the vertical direction. As a result, when the fork claw portion 52 is to be inserted into the pallet 100, even though the fork pocket 102 is tilted upward or downward, since the fork member 50 is displaced to align with the inclination, it is possible to insert the fork member 50 while preventing the pallet 100 and the cargo front being flipped over.

The fork member 50 of the forklift 1 having the above-mentioned configuration may be held on the lift bracket 30 when a weight is applied to the fork member 50. When a weight is applied to the fork member 50, since the fork member 50 is held on the lift bracket 30, it is possible to transport the pallet 100 and the cargo while preventing the fork member 50 from coming into contact with the ground or the like.

Figure 6:
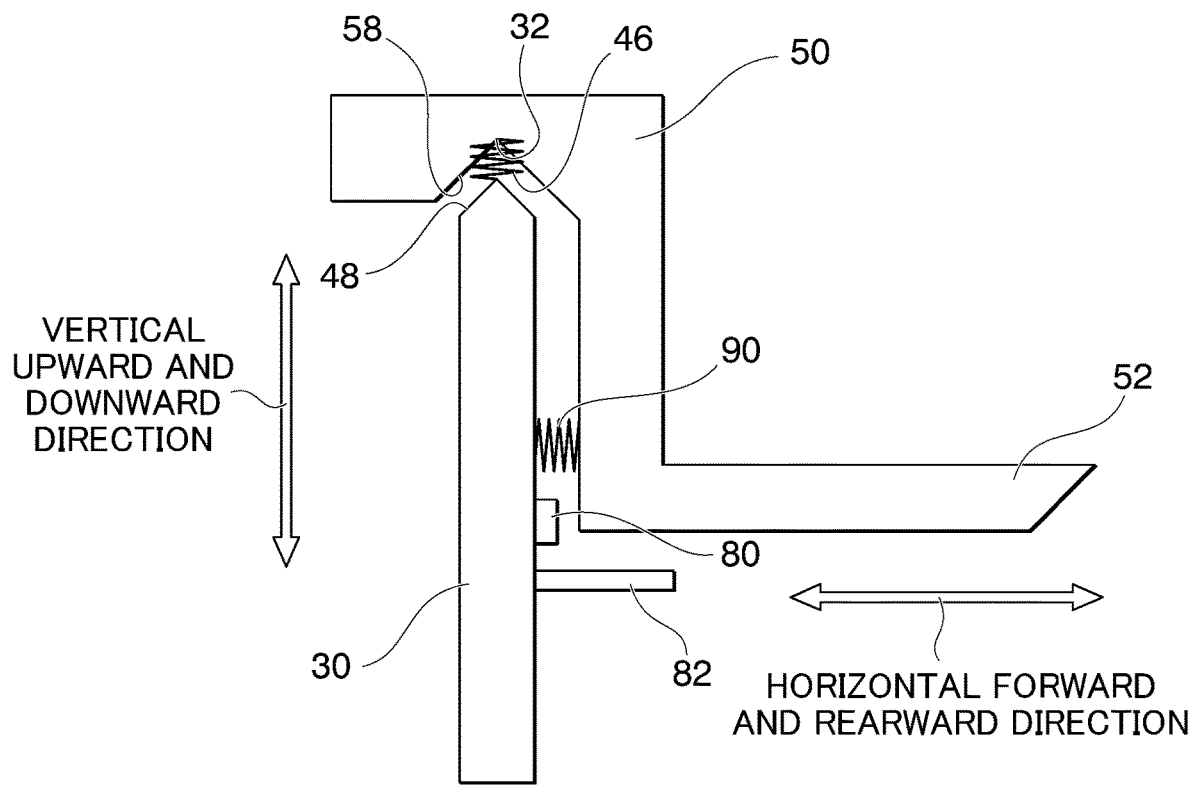
FIG. 6 is a schematic configuration view of a fork member and a lift bracket according to one embodiment of the present invention.

The forklift 1 according to one embodiment shown in FIG. 6 includes an elastic support portion 46 that is provided between the support portion 32 of the lift bracket 30 and the fork member 50 on a surface where the support portion 32 of the lift bracket 30 and the fork member 50 face each other in the vertical direction. The lift bracket 30 includes a lift bracket male-tapered surface 48 that is tapered in the vertical direction, and the fork member 50 includes a fork member female-tapered surface 58 that is tapered in the vertical direction. The elastic support portion 46 is a compression spring, and may be attached to a position corresponding to the position of each of the fork members 50. As a result, when the pallet 100 and the cargo are loaded onto the fork member 50, since the elastic support portion 46 is contracted, and the fork member 50 is held on the lift bracket 30 by taper joint, it is possible to transport the pallet 100 and the cargo while preventing the fork member 50 from coming into contact with the ground or the like. In this case, the angle of the V-shaped protrusion portion 34 may be substantially the same as the angle of the groove of the V-shaped recess portion 54. Therefore, the lift bracket male-tapered surface 48 and the fork member female-tapered surface 58 are sufficiently held to each other.

Figure 7:
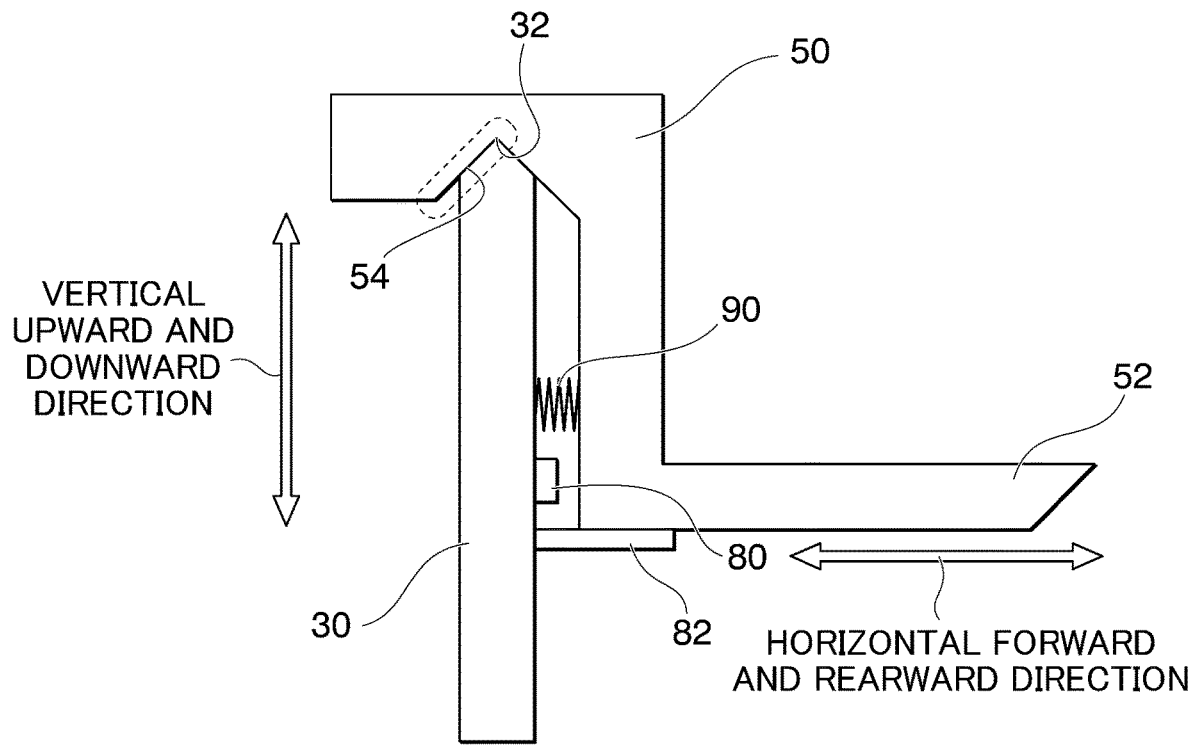
FIG. 7 is a schematic configuration view of a fork member and a lift bracket according to one embodiment of the present invention.

Incidentally, as shown in FIG. 7, the angle of the groove of the V-shaped recess portion 54 may be less than 90 degrees, when the angle of the groove is formed so as to be less than 90 degrees, even though a large rotational moment is applied to the tapered surfaces, it is possible to prevent the fork member 50 from escaping from the lift bracket 30.

In addition, in the forklift 1 according to one embodiment shown in FIGS. 8 and 9, the lift bracket 30 includes a lift bracket upper member 40a; a lift bracket lower member 42a that is positioned below the lift bracket upper member 40a in the vertical direction; a damper member 44a that connects the lift bracket upper member 40a to the lift bracket lower member 42a in the vertical direction; and a lift bracket lateral member 62a that has a lift bracket lateral member male-tapered surface 64a, which is tapered in the vertical direction, in a surface facing the fork member 50 and is provided at least partly around the lift bracket upper member 40a and the lift bracket lower member 42a. The lift bracket upper member 40a, the lift bracket lower member 42a, and the lift bracket lateral member 62a are members that have a planar shape in the rightward and leftward direction, and may be attached in common to the plurality of fork members 50. In addition, the lift bracket lateral member 62a is fixed to the lift bracket lower member 42a, and the lift bracket upper member 40a is supported so as to be capable of being moved upward and downward on the lift bracket lateral member 62a. The damper member 44a may be a compression spring or rubber. When the damper member 44a is a compression spring, a sufficient number of the damper members 44a are attached so as to support the lift bracket, upper member 40a. For example, the compression springs are provided at predetermined intervals in a horizontal direction of the lift bracket lower member 42a. In addition, when the damper member 44a is rubber, the damper member 44a may be attached in the same manner as the compression spring, or may be a member having a planar shape in the rightward and leftward direction.

Figure 8:
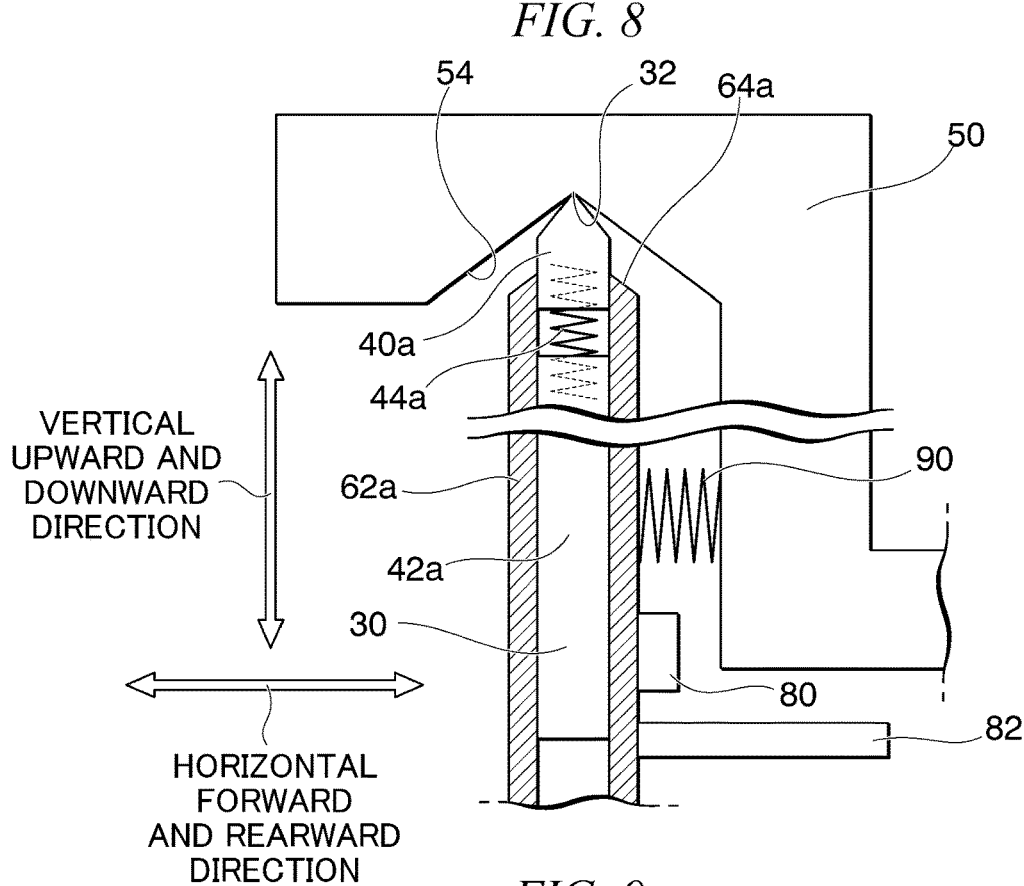
FIG. 8 is a schematic configuration view of a fork member and a lift bracket according to one embodiment of the present invention.

As shown in FIG. 8, at no load, a space is held between the lift bracket lateral member 62a and the fork member 50. In addition, the length of the lift bracket lateral member 62a is adjusted such that the width of the space is smaller than the amount where the damper member 44a is contracted when a weight is applied to the fork member 50. Furthermore, even though the fork claw portion 52 is displaced (tilted) in the vertical direction, the length is adjusted such that the fork member 50 does not come into contact with the ground or the like.

Figure 9:
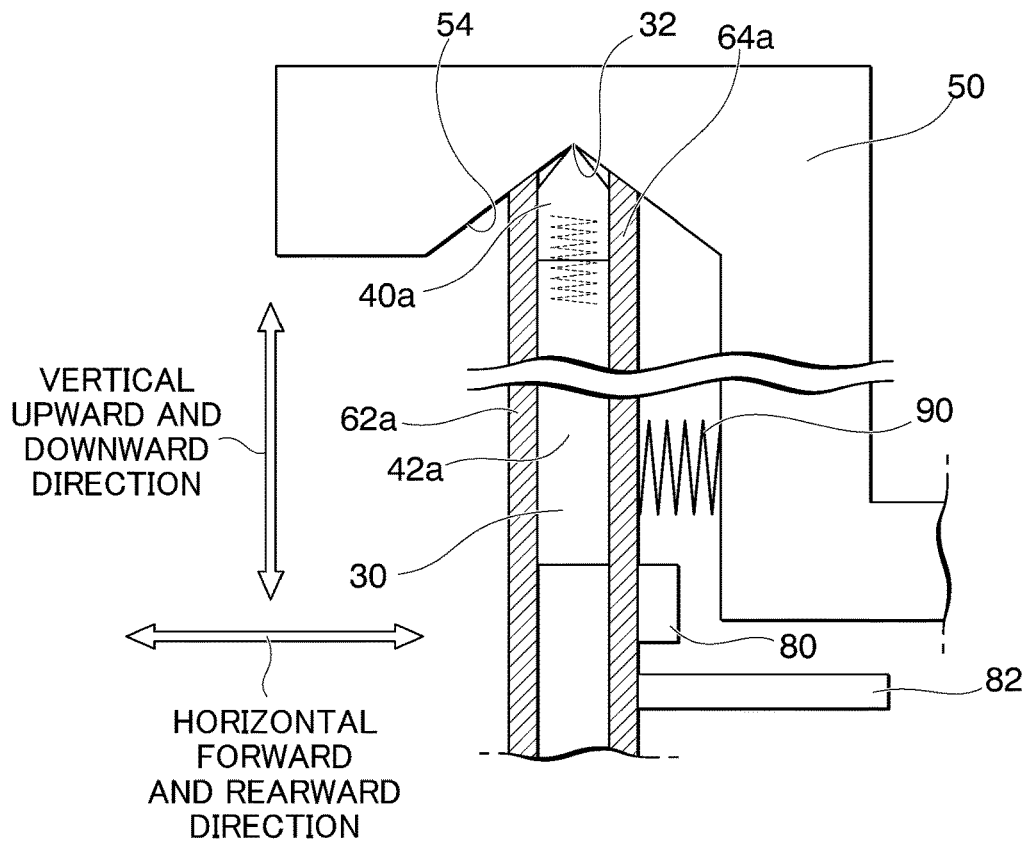
FIG. 9 is a schematic configuration view of a fork member and a lift bracket according to one embodiment of the present invention.

As shown in FIG. 9, when a weight is applied to the fork member 50, since the damper member 44a becomes contracted, and as a result, the lift bracket lateral member male-tapered surface 64a of the lift bracket lateral member 62a comes into contact with the V-shaped recess portion 54 of the fork member 50, the fork member 50 is held on the lift bracket lateral member 62a by taper joint. As a result, when the pallet 100 and the cargo are loaded onto the fork member 50, it is possible to transport the pallet 100 and the cargo while preventing the fork claw portion 52 from coming into contact with the ground or the like. In this case, the angle of the lift bracket lateral member male-tapered surface 64a may be substantially equal to the angle of the groove of the V-shaped recess portion 54 of the fork member 50. Therefore, the V-shaped recess portion 54 are sufficiently held on the lift bracket lateral member male-tapered surface 64a.

Furthermore, in the forklift 1 according to one embodiment shown in FIG. 10, the lift bracket 30 includes a shaft member 38 extending in the horizontal direction; a lilt bracket upper member 40b that supports the shalt member 38; a lift bracket lower member 42b that is positioned below the lift bracket upper member 40b in the vertical direction; and a damper member 44b that connects the lift bracket upper member 40b to the lift bracket lower member 42b in the vertical direction. The fork member 50 is rotatably supported on the shaft member 38. In addition, the lift bracket 30 may further include a lift bracket lateral member 62b that has a lift bracket lateral member male-tapered surface 64b, which is tapered in the vertical direction, in a surface facing the fork member 50 and is provided at least partly around the lift bracket upper member 40b and the lift bracket lower member 42b.

Figure 10:
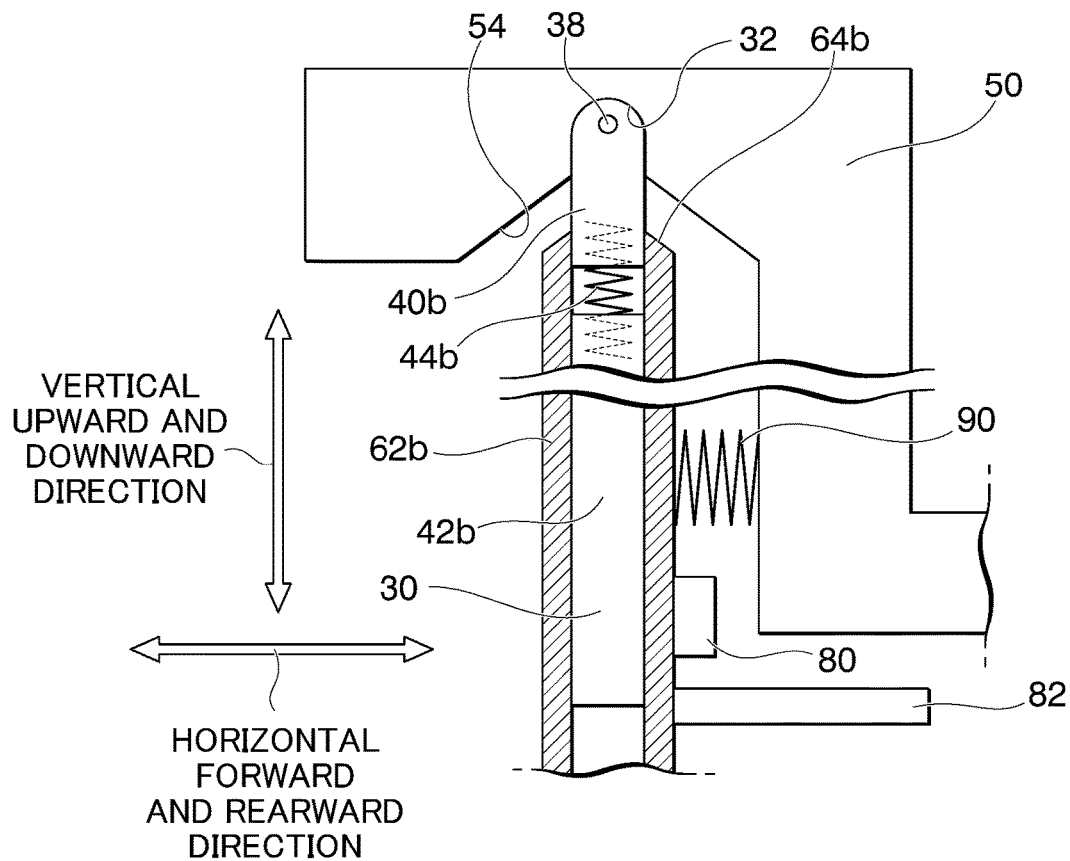
FIG. 10 is a schematic configuration view of a fork member and a lift bracket according to one embodiment of the present invention.

As shown in FIG. 10, at no load, a space is, held between the lift bracket lateral member 62b and the fork member 50. When a weight is applied to the fork member, since the damper member 44b becomes contracted, and the lift bracket lateral member male-tapered surface 64b of the lift bracket lateral member 62b comes into contact with the fork member 50, the fork member 50 is held on the lift bracket 30.

In the forklift 1 according to the embodiment shown in FIG. 10, since the fork member 50 is rotatably supported on the shaft member 38, the fork member 50 can be displaced around the shaft member 38, which serves as a pivot, in the direction of an application force that is exerted onto the fork member 50 in the vertical direction. In addition, when a weight is applied to the fork member 50, since the fork member 50 is held on the lift bracket 30, and the displacement of the fork member 50 is limited, it is possible to transport the pallet 100 and the cargo while preventing the fork member 50 from coming into contact with the ground or the like.

The fork member 50 having the above-mentioned configuration includes the fork claw portion 52 to be inserted into the fork pocket 102, and the fork claw portion 52 may be held in a substantially horizontal direction at no load.

Since the fork claw portion 52 is held in a substantially horizontal direction, the fork claw portion 52 can be placed and moved without contact with the ground or the like.

In addition, as shown in FIGS. 6 to 10, the lift bracket 30 according to one embodiment of the present invention may include a receiving member 82 that is positioned below the fork member 50 in the vertical direction at no load and receives a force which is applied from the fork member 50 in the vertical direction.

When the pallet 100 and the cargo are loaded onto the fork claw portion 52, even though a weight is applied to the fork claw portion 52 in the vertical direction, the weight can be received by the receiving member 82. The receiving member 82 is positioned above a position where an amount, by which the elastic support portion 46 shown in FIG. 6, the damper member 44a of the forklift 1 shown in FIG. 8, or the damper member 44b of the forklift 1 shown in FIG. 10 is contracted from the position of the fork member 50 at no load when the pallet 100 and the cargo are loaded onto the fork claw portion 52, is added. In addition, the receiving member 82 has the strength required to support the fork member 50, for example, a strength greater than or equal to the strength of the lift bracket 30, and a length greater than or equal to a space through which the fork member 50 is opposite to the lift bracket 30 in the horizontal direction. In addition, the receiving member 82 may be attached to a position corresponding to the position of each of the fork members 50, or may be attached in common to the plurality of fork members 50 via a member having a planar shape in the rightward and leftward direction.

Figure 11:
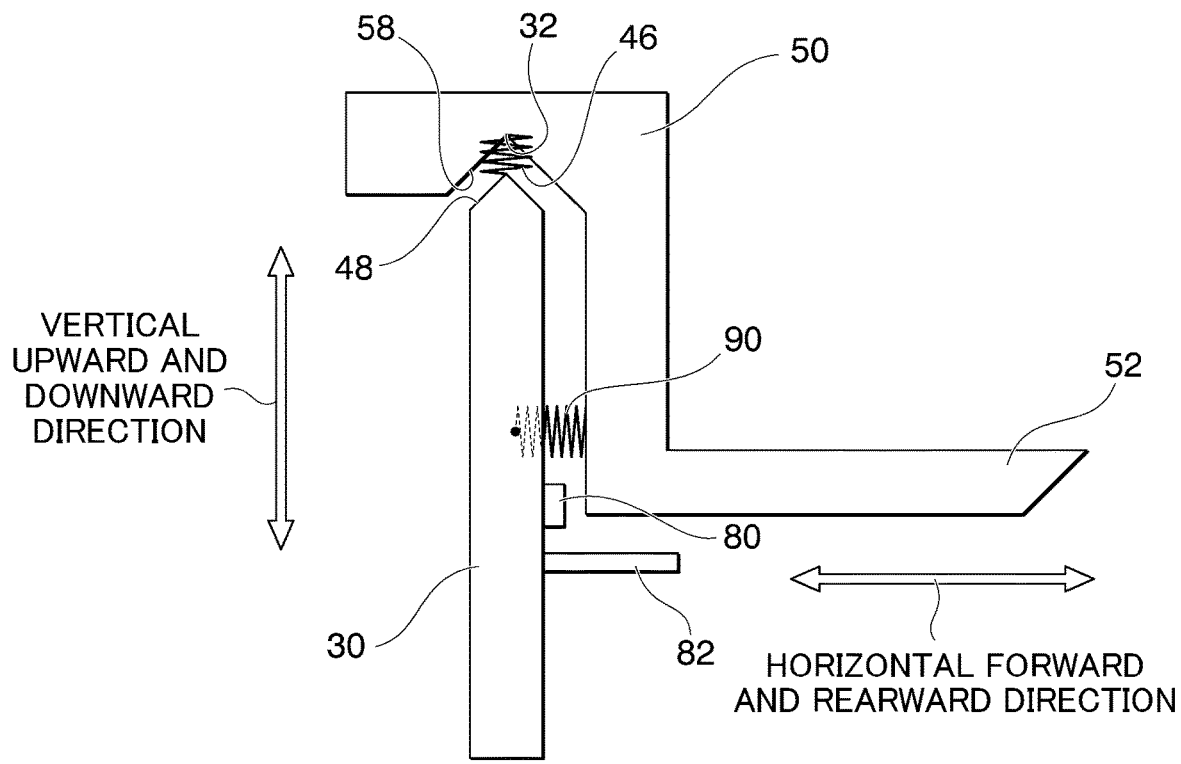
FIG. 11 is a schematic configuration view of a fork member and a lift bracket according to one embodiment of the present invention.
Figure 12:
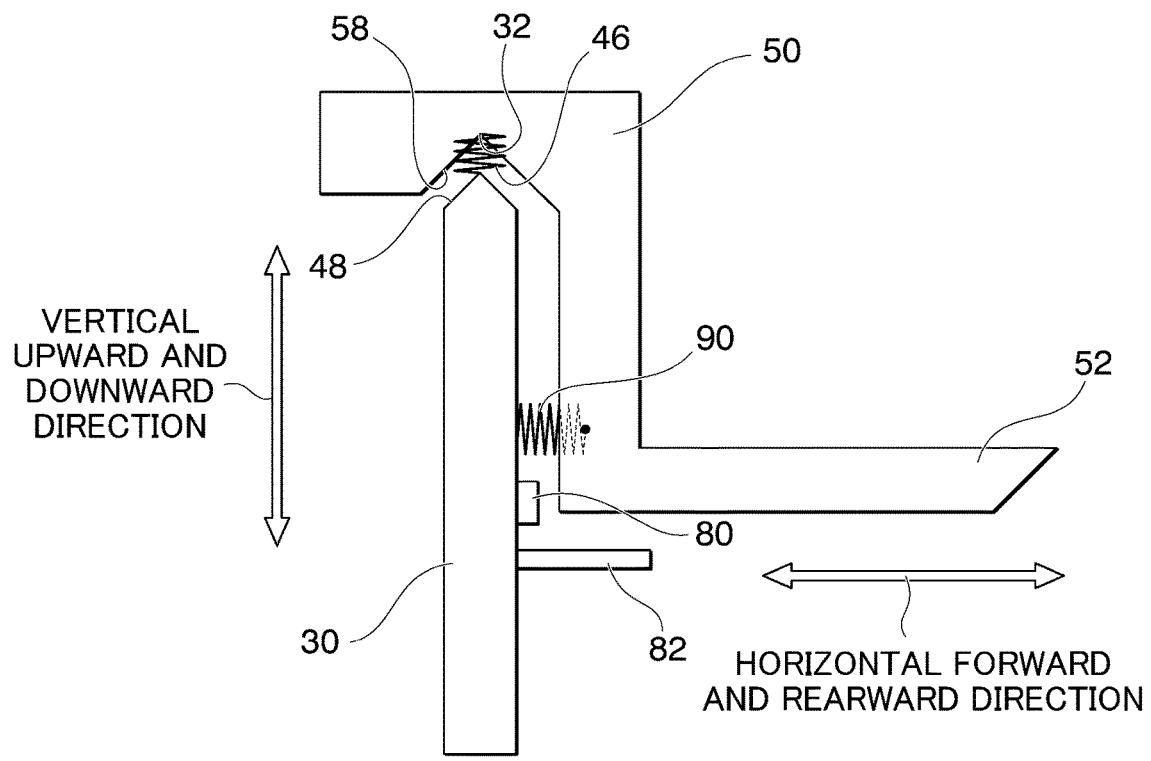
FIG. 12 is a schematic configuration view of a fork member and a lift bracket according to one embodiment of the present invention.

In addition, in the embodiments according to FIGS. 3 to 10, the elastic member 90 is fixed to both of the fork member 50 and the lift bracket 30; however, as shown in FIGS. 11 and 12, the elastic member 90 may be fixed to either one of the lift bracket 30 or the fork member 50 without being fixed to the other.

Namely, since the elastic member 90 is fixed to either one of the lift bracket 30 or the fork member 50 and the other is free, when the pallet 100 and the cargo are loaded onto the fork claw portion 52, even though the elastic support portion 46 is contracted due to the weights of the pallet 100 and the cargo loaded on the pallet 100, the elastic member 90 is maintained in a state where no load is applied thereto in the vertical direction. As a result, it is possible to prevent the elastic member 90 from being worn out or deformed.

In an embodiment according to FIG. 11, one end of the elastic member 90 is fixed to the lift bracket 30, and the other is not fixed to the fork member 50. As a result, even though the fork member 50 is exchanged with a fork member having another shape, it is possible to use the elastic member 90 in common.

On the other hand, in an embodiment according to FIG. 12, one end of the elastic member 90 is fixed to the fork member 50, and the other is not fixed to the lift bracket 30. As a result, it is possible to exchange the elastic member 90 by exchanging the fork member 50, thereby improving maintainability.

Figure 13:
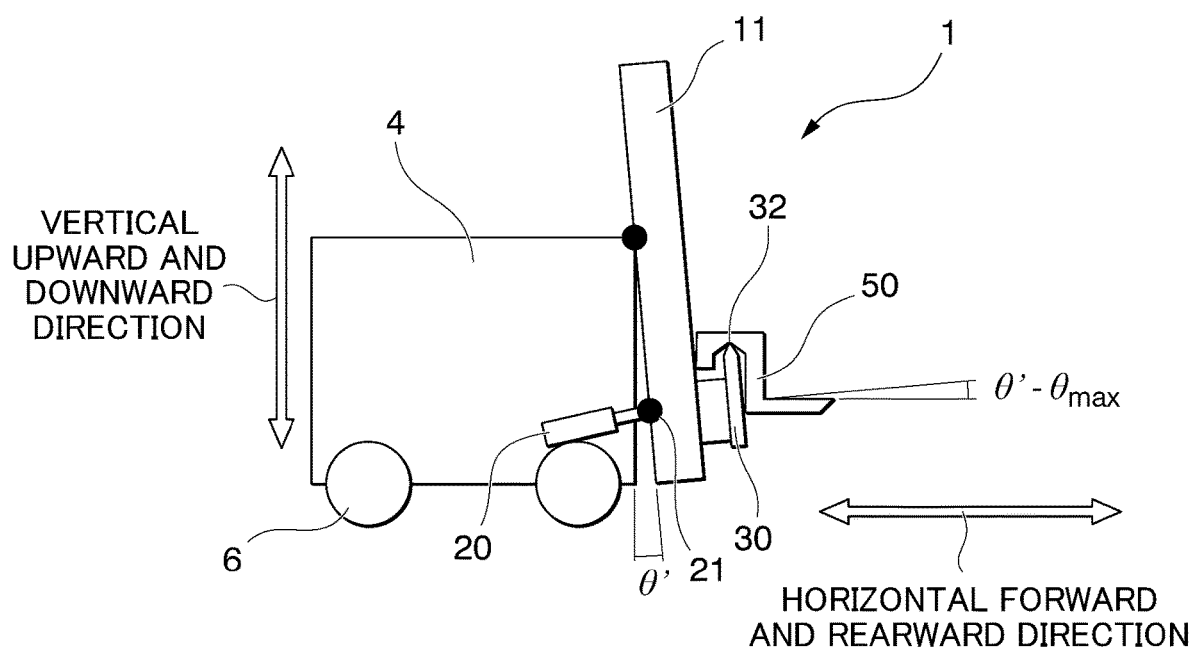
FIG. 13 is a schematic configuration view illustrating a deflection angle of a forklift according to one embodiment of the present invention.

FIG. 13 is a schematic configuration view illustrating a deflection angle of the fork member 50 according to one embodiment of the present invention.

As shown in FIG. 13, the deflection angle of the fork member 50 refers to an angle that is made with respect to the horizontal direction in a state where the fork claw portion 52 of the fork member 50 is inclined.

The forklift 1 according to one embodiment of the present invention further includes the tilt cylinder 20 that is provided in the lift bracket 30 and is capable of tilting the fork member 50 at an angle greater than or equal to a maximum deflection angle $\theta$max of the fork member 50. When the tilt cylinder 20 extends and thereby an extension force of the tilt cylinder 20 is transmitted to a contact portion 21 of the mast member 11, accordingly the mast member 11 and the lift bracket 30 are tilted. While tilting the lift bracket 30, the fork member 50 is inclined around the support portion 32 of the lift bracket 30 which serves as a pivot.

The tilt cylinder 20 is operated by, for example, hydraulic pressure.

Even though the fork member 50 is deflected when the fork claw portion 52 is inserted into the fork pocket 102 of the pallet 100, after the pallet 100 is loaded onto the fork claw portion 52, the tilt cylinder 20 is capable of tilting the fork member 50 upward at an angle greater than or equal to the deflection angle of the fork member 50. For example, even though the fork member 50 is deflected at the position of the maximum deflection angle $\theta$max, since the tilt cylinder 20 is capable of tilting the mast member 11 upward at an angle $\theta'$, accordingly the fork member 50 can be tilted at a positive angle ($\theta'$-$\theta$max). As a result, the pallet 100 and the cargo loaded on the fork member 50 can be transported without being flipped over.

The forklift 1 described in each embodiment is understood, for example, as follows.

(1) The forklift 1 according to a first aspect includes the lift bracket 30 which is supported on the mast so as to be capable of being moved upward and downward on the mast; and the fork member 50 having the fork claw portion 52 on which the pallet 100 is allowed to be placed, and supported on the lift bracket 30. The lift bracket 30 has the support portion 32 which is formed on a tip portion of the lift bracket and which supports the fork member 50. When a weight is applied onto the fork claw portion 52, the fork member 50 displaces around the support portion 32, which serves as a pivot, in response to the application force P exerted onto the fork claw portion 52.

In the forklift 1 according to the first aspect, even though the fork pocket 102 of the pallet 100 is inclined due to the weight of a loaded cargo, since the fork member 50 (the fork claw portion 52) receives the application force P from the fork pocket 102 and is displaced in response to the inclination, it is possible to insert the fork member 50 (the fork claw portion 52) into the fork pocket 102 while preventing the pallet 100 and the cargo from being flipped over.

(2) According to the forklift 1 of a second aspect, in the forklift 1 according to the first aspect, the support portion 32 supports the fork member 50 at one point when seen from the side of the vehicle body 4.

In the forklift 1 according to the second aspect, the fork member 50 is balanced due to being supported at one point by the support portion 32, and the fork member 50 can be displaced around the support portion 32, which serves as a pivot, in the vertical direction in response to the application force P exerted onto the fork member 50. Therefore, even though the fork pocket 102 is inclined upward or downward, since the fork member 50 is displaced in response to the inclination of the fork pocket 102, it is possible to insert the fork member 50 while preventing the pallet 100 and the cargo from being flipped over.

(3) In the forklift 1 according to the first or second aspect, the forklift 1 according to a third aspect further includes the elastic member 90 attached to the surface where the lift bracket 30 and the fork member 50 face each other in the horizontal direction. When a weight is applied to the fork claw portion 52, the fork member 50 displaces around the support portion 32, which is configured to serve as a pivot, in the direction of the application force P due to the stress of the elastic member 90.

In the forklift 1 according to the third aspect, with the support portion 32 interposed between portions of the fork member 50, the fork member 50 is balanced between front and rear by the reaction force of the elastic member 90. As a result, when the application force P is applied to the fork member 50, the elastic member 90 is contracted, and the fork member 50 can be displaced in the vertical direction. For this reason, even though the fork pocket 102 of the pallet 100 is inclined due to the weight of the loaded cargo, the fork member 50 is displaced in response to the inclination of the fork pocket 102. Therefore, it is possible to insert the fork member 50 into the fork pocket 102 while preventing the pallet 100 and the cargo from being flipped over.

(4) According to the forklift 1 of a fourth aspect, in the forklift 1 according to the third aspect, the lift bracket 30 further includes the spacer member 80 on the surface where the lift bracket 30 and the fork member 50 face each other in the horizontal direction.

In the forklift 1 according to the fourth aspect, the deflection angle of the fork member 50 can be adjusted by the spacer member 80. As a result, it is possible to prevent a load from being applied to the elastic member 90.

(5) According to the forklift 1 of a fifth aspect, in the forklift 1 according to any one of the first to fourth aspects, the support portion 32 includes the V-shaped protrusion portion 34 which is a protrusion portion having a V shape, and the fork member 50 includes the V-shaped recess portion 54 that is a recess portion having a V shape which is supported by the support portion 32.

In the forklift 1 according to the fifth aspect, since the V-shaped recess portion 54 of the fork member 50 is supported at one point by the V-shaped protrusion portion 34 of the support portion 32, the fork member 50 can be displaced around the support portion 32, which is configured to serve as a pivot, in the vertical direction in response to the application force P exerted onto the fork member 50.

(6) According to the forklift 1 of a sixth aspect, in the forklift 1 according to any one of the first to fourth aspects, the support portion 32 includes the arc-shaped protrusion portion 36 which is a protrusion portion having an arc shape, and the fork member 50 includes the arc-shaped recess portion 56 which is a recess portion having an arc shape and having a larger curvature than that of the arc-shaped protrusion portion 36 of the support portion 32.

In the forklift 1 according to the sixth aspect, since the arc-shaped recess portion 56 of the fork member 50 is supported at one point by the arc-shaped protrusion portion 36 of the support portion 32, the fork member 50 can be displaced around the support portion 32, which is configured to serve as a pivot, in the vertical direction in response to the application force P exerted onto the fork member 50.

(7) According to the forklift 1 of a seventh aspect, in the forklift 1 according to any one of the third to sixth aspects, when a weight is applied to the fork member 50, the fork member 50 is held on the lift bracket 30.

In the forklift 1 according to the seventh aspect, when a weight is applied to the fork member 50, since the fork member 50 is held on the lift bracket 30, it is possible to transport the pallet 100 and the cargo while preventing the fork member 50 from coming into contact with the ground or the like.

(8) According to the forklift 1 of an eighth aspect, in the forklift 1 according to the seventh aspect, one end of the elastic member 90 is fixed to either one of the lift bracket 30 or the fork member 50, the other end of the elastic member 90) is free from the other.

In the forklift 1 according to the eighth aspect, since one end of the elastic member 90 is fixed to either one of the lift bracket 30 or the fork member 50 and the other end of the elastic member 90 is free from the other, even though the elastic support portion 46 is contracted due to the weights of the pallet 100 and the cargo loaded on the pallet 100, the fork member 50 is maintained in a state where no load is applied to the elastic member 90 in the vertical direction. As a result, it is possible to prevent the elastic member 90 from being worn out or deformed.

(9) In the forklift 1 according to the seventh or eighth aspect, the forklift 1 according to a ninth aspect includes the elastic support portion 46 that is provided between the support portion 32 of the lift bracket 30 and the fork member 50 on the surface where the support portion 32 of the lift bracket 30 and the fork member 50 face each other in the vertical direction. The support portion 32 of the lift bracket 30 includes the lift bracket male-tapered surface 48 that is tapered in the vertical direction, and the fork member 50 includes the fork member female-tapered surface 58 that is tapered in the vertical direction, and is supported by the support portion 32 at the fork member female-tapered surface 58.

In the forklift 1 according to the ninth aspect, when the pallet 100 and the cargo are loaded onto the fork member 50, since the elastic support portion 46 is contracted, and the fork member 50 is held on the lift bracket 30 by taper joint, it is possible to transport the pallet 100 and the cargo while preventing the fork member 50 from coming into contact with the ground or the like.

(10) According to the forklift 1 of a tenth aspect, in the forklift 1 according to the seventh or eighth aspect, the lift bracket 30 includes the shaft member 38 extending in the horizontal direction; the lift bracket upper member 40b that is rotatably supported on the shaft member 38; the lift bracket lower member 42b that is positioned below the lift bracket upper member 40b in the vertical direction; the damper member 44b that is provided between the lift bracket upper member 40b and the lift bracket lower member 42b to connect the lift bracket upper member 40b to the lift bracket lower member 42b in the vertical direction; and the lift bracket lateral member 62b that has the lift bracket lateral member male-tapered surface 64b, which is tapered in the vertical direction, in the surface facing the fork member 50 and is provided at least partly around the lift bracket upper member 40b and the lift bracket lower member 42b below an uppermost portion of the lift bracket upper member 40b.

In the forklift 1 according to the tenth aspect, since the fork member 50 is rotatably supported on the shaft member 38, the fork member 50 can be displaced around the shaft member 38, which is configured to serve as a pivot, in the vertical direction in response to the application force P exerted onto the fork member 50. In addition, when the pallet 100 and the cargo are loaded onto the fork member 50, since the damper member 44b is contracted, and the fork member 50 is held on the lift bracket lateral member 62b by taper joint, it is possible to transport the pallet 100 and the cargo while preventing the fork member 50 from coming into contact with the ground or the like.

(11) According to the forklift 1 of an eleventh aspect in the forklift 1 according to any one of the seventh to tenth aspects, the lift bracket 3i) further includes the receiving member 82 that is positioned below the fork member 50 in the vertical direction and receives a force which is applied from the fork member 50 in the vertical direction.

In the forklift 1 according to the eleventh aspect, when the pallet 100 and the cargo are loaded onto the fork claw portion 52, even though a weight is applied to the fork claw portion 52 in the vertical direction, the weight can be received by the receiving member 82.

(12) According to the forklift 1 of a twelfth aspect, in the forklift 1 according to any one of the first to eleventh aspects, the lift bracket 30 further includes the tilt cylinder 20 that is configured to tilt the fork member 50 at an angle greater than or equal to the deflection angle of the fork member 50.

In the forklift 1 according to the twelfth aspect, even though the fork member 50 is displaced at the position of the deflection angle, since the tilt cylinder 20 is capable of tilting the fork member 50 upward at an angle greater than or equal to the deflection angle of the fork member 50, the pallet 100 and the cargo loaded on the fork member 50 can be transported without being flipped over.

(13) The fork member 50 according to a thirteenth aspect is the fork member 50, and is supported by the support portion 32 which supports the fork member 50 in the tip portion of the lift bracket 30 which is supported on the mast of the forklift 1 so as to be capable of being moved upward or downward, so that when a weight is applied to the fork claw portion 52 of the fork member 50, the fork member 50 displaces around the support portion 32, which is configured to serve as a pivot, in response to the application force P exerted onto the fork claw portion 52.

In the fork member 50 according to the thirteenth aspect, even though the fork pocket 102 of the pallet 100 is inclined due to the weight of a loaded cargo, since the fork member 50 (the fork claw portion 52) receives the application force P from the fork pocket 102 and is displaced in response to the inclination, it is possible to insert the fork member 50 (the fork claw portion 52) into the fork pocket 102 while preventing the pallet 100 and the cargo from being flipped over.

The present invention is not limited to the embodiments described above, and includes forms in which modifications are made to the embodiments described above, and also forms in which the forms are appropriately combined together.

EXPLANATION OF REFERENCES

1: forklift
4: vehicle body
6: wheel
8: driver seat
10: cargo handling device
11: mast member
12: outer mast
14: outer guide
16: inner mast
18: chain
20: tilt cylinder
21: contact portion
22: contact portion
30: lift bracket
32: support portion
33: front surface
34: V-shaped protrusion portion
36: arc-shaped protrusion portion
38: shaft member
40: lift bracket upper member
42: lift bracket lower member
44: damper member
46: elastic support portion
48: lift bracket male-tapered surface
50: fork member
52: fork claw portion
53: rear surface
54: V-shaped recess portion
56: arc-shaped recess portion
58: fork member female-tapered surface
60: fork support portion
62: lift bracket lateral member
64: lift bracket lateral member male-tapered surface
80: spacer member
82: receiving member
90: elastic member
100: pallet
102: fork pocket
P: application force
θ: deflection angle
θmax: maximum deflection angle

What is claimed is:

1. A forklift comprising:
a lift bracket which is supported on a mast so as to be capable of being moved upward or downward along the mast; and
a fork member having a fork claw portion on which a pallet is allowed to be placed, and supported on the lift bracket,
wherein:
the lift bracket has a support portion which is on a tip portion of the lift bracket and supports the fork member when seen from a side of a vehicle body; and
when a weight is applied onto the fork claw portion, the fork member is configured to rotate around the support portion which is configured to serve as a pivot, in response to an application force exerted onto the fork claw portion.

2. The forklift according to claim 1, further comprising:
an elastic member between the lift bracket and the fork member facing each other in a horizontal direction,
wherein, when the weight is applied onto the fork claw portion, the fork member is configured to rotate around the support portion which is configured to serve as the pivot, in a direction of the application force due to a stress of the elastic member.

3. The forklift according to claim 2, wherein the lift bracket includes a spacer member at a position between the lift bracket and the fork member facing each other in the horizontal direction.

4. The forklift according to claim 2, wherein when the weight is applied to the fork member, the fork member is held on the lift bracket.

5. The forklift according to claim 4, wherein the elastic member is fixed to the lift bracket without being fixed to the fork member.

6. The forklift according to claim 4, further comprising:
an elastic support portion between the support portion of the lift bracket and the fork member on a surface where the support portion of the lift bracket and the fork member face each other in a vertical direction,
wherein:
the support portion of the lift bracket includes a lift bracket male-tapered surface that is tapered in the vertical direction; and
the fork member includes a fork member female-tapered surface that is tapered in the vertical direction, and is supported on the lift bracket male-tapered surface by the support portion.

7. The forklift according to claim 4, wherein the lift bracket includes:
a shaft member extending in the horizontal direction;
a lift bracket upper member which is rotatably supported on the shaft member,
a lift bracket lower member which is below the lift bracket upper member in a vertical direction;
a damper member which is between the lift bracket upper member and the lift bracket lower member to connect the lift bracket upper member and the lift bracket lower member in the vertical direction; and
a lift bracket lateral member which has a lift bracket lateral member male-tapered surface, which is tapered in the vertical direction, in a surface facing the fork member and is provided at least partly around the lift bracket upper member and the lift bracket lower member below an uppermost portion of the lift bracket upper member.

8. The forklift according to claim 4, wherein the lift bracket includes a receiving member which is below the fork member in a vertical direction and configured to receive the application force which is applied from the fork member in the vertical direction.

9. The forklift according to claim 4, wherein the elastic member is fixed to the fork member without being fixed to the lift bracket.

10. The forklift according to claim 1, wherein:
the support portion includes a V-shaped protrusion portion which is a protrusion portion having a V shape; and
the fork member includes a V-shaped recess portion which is a recess portion having a V shape which is supported by the support portion.

11. The forklift according to claim 1, wherein:
the support portion includes an arc-shaped protrusion portion which is a protrusion portion having an arc shape; and
the fork member includes an arc-shaped recess portion which is a recess portion having an arc shape and having a curvature that is larger than a curvature of the arc-shaped protrusion portion of the support portion.

12. The forklift according to claim 1, wherein the lift bracket further includes a tilt cylinder which is configured to tilt the fork member at an angle greater than or equal to a deflection angle of the fork member.

13. A fork member of a forklift, which is supported when seen from a side of a vehicle body, by a support portion on a tip portion of a lift bracket which is supported on a mast of the forklift so as to be capable of being moved upward or downward, wherein, when a weight is applied onto a fork claw portion of the fork member, the fork member is configured to rotate around the support portion which is configured to serve as a pivot, in response to an application force exerted onto the fork claw portion.

* * * * *